US010618567B2

(12) United States Patent
Guariento (10) Patent No.: US 10,618,567 B2
(45) Date of Patent: Apr. 14, 2020

(54) VEHICLE SHOCK TOWER ASSEMBLY AND FORMING METHOD

(71) Applicant: Ford Global Technologies, LLC, Dearborn, MI (US)

(72) Inventor: Alessandro C. Guariento, Oak Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 197 days.

(21) Appl. No.: 15/868,135

(22) Filed: Jan. 11, 2018

(65) Prior Publication Data

US 2019/0210656 A1    Jul. 11, 2019

(51) Int. Cl.
| | | |
|---|---|---|
| *B62D 25/08* | (2006.01) | |
| *B33Y 80/00* | (2015.01) | |
| *B33Y 50/00* | (2015.01) | |
| *B62D 29/00* | (2006.01) | |

(52) U.S. Cl.
CPC ............ *B62D 25/088* (2013.01); *B33Y 50/00* (2014.12); *B33Y 80/00* (2014.12); *B62D 25/082* (2013.01); *B62D 29/008* (2013.01)

(58) Field of Classification Search
CPC .... B62D 25/082; B62D 25/088; B33Y 50/00; B33Y 80/00
USPC ......................................... 296/193.09, 203.02
See application file for complete search history.

(56) References Cited

U.S. PATENT DOCUMENTS

| | | | |
|---|---|---|---|
| 5,729,463 A | 3/1998 | Koenig | |
| 2011/0245950 A1 | 10/2011 | Overton | |
| 2013/0221708 A1* | 8/2013 | Hanakawa | ........... B62D 25/088 296/193.09 |
| 2016/0264176 A1* | 9/2016 | Balzer | .................. B62D 25/088 |

FOREIGN PATENT DOCUMENTS

| | | | | |
|---|---|---|---|---|
| DE | 102015014410 A1 | 5/2016 | | |
| FR | 2967965 A1 * | 6/2012 | ........... | B62D 25/088 |
| WO | WO-2018/148200 A1 * | 8/2018 | ............. | B62D 25/08 |

* cited by examiner

*Primary Examiner* — Jason S Morrow
(74) *Attorney, Agent, or Firm* — Brooks Kushman PC; David Coppiellie (57) ABSTRACT

A vehicle shock tower component including a top portion, an upper portion, and a lower portion is provided. The top portion defines a plane. The upper portion may include one or more upper spokes having a thickness based on a stiffness ratio to disperse load paths resulting from a force application to the upper portion. The upper spokes may extend substantially perpendicularly from the plane and an intersection spoke region may extend substantially perpendicularly from the plane. The lower portion may include one or more lower spokes extending at an angle from the one or more upper spokes and the intersection spoke region to a base portion for securing to a vehicle wheel well. Each of the spokes may be aligned with a load path defined by application of a force to the top portion in which the force is applied in a direction substantially perpendicular to the plane.

10 Claims, 8 Drawing Sheets

VEHICLE SHOCK TOWER ASSEMBLY AND FORMING METHOD

TECHNICAL FIELD

This disclosure relates to structures and forming methods for components of vehicle shock tower assemblies.

BACKGROUND

The automotive industry faces continuous challenges to increase vehicle component performance while reducing weight. Manufacturing processes may limit options available for vehicle component formation. Stamping and casting are two existing vehicle component forming processes. These processes have limitations with regard to complexity of vehicle component design and often include excess material to form the vehicle components.

This disclosure is directed to solving the above problems and other problems as summarized below.

SUMMARY

According to an aspect of the present disclosure, a vehicle shock tower assembly includes a shock tower and an engine compartment cross beam. The shock tower includes a base portion secured to a wheel well, a lower portion, an upper portion, and a top portion. The engine compartment cross beam is secured to the top portion. Each of the lower portion and the upper portion includes spokes extending along load paths corresponding to a vertical force applied substantially perpendicular to a plane defined by the top portion.

The lower portion of the shock tower may further include a plurality of lower spokes spaced from one another, each having an end connecting to the base portion. The upper portion of the shock tower may further include a spoke intersection region located at a region corresponding to a crossing of two of the load paths. The load paths corresponding to the vertical force may cross one another at an intersection region, and a structure of the spokes may define the intersection region as having a width greater than a width of one of the spokes. The spokes of the upper portion may be formed by a first plurality of bonded layers defining a first component width and the spokes of the lower portion may be formed by a second plurality of bonded layers defining a second component width different than the first component width. The shock tower may be made of one of aluminum and magnesium. The top portion of the shock tower may further include three receiving apertures radially spaced from one another for alignment with a front suspension mount and sized to receive a fastener for securing the top portion to the front suspension mount.

According to another aspect of the present disclosure, a vehicle shock tower component includes a top portion, an upper portion, and a lower portion. The top portion defines a plane. The upper portion includes one or more upper spokes having a thickness based on a stiffness ratio to disperse load paths resulting from a force application to the upper portion. The upper spokes extend substantially perpendicularly from the plane and an intersection spoke region extends substantially perpendicularly from the plane. The lower portion includes one or more lower spokes extending at an angle from the one or more upper spokes and the intersection spoke region to a base portion for securing to a vehicle wheel well. Each of the spokes is aligned with a load path defined by application of a force to the top portion in which the force is applied in a direction substantially perpendicular to the plane.

Each of the one or more upper spokes, the one or more lower spokes, and the intersection spoke region may define a non-uniform cross section and may include curved and soft-shaped surfaces resembling a bone-like structure. The one or more upper spokes, the one or more lower spokes, and the intersection spoke region may be arranged with one another to define a web-like or scaffolding-like structure. The intersection spoke region may be further defined as a region in which two of the load paths cross one another. Each of the one or more upper spokes and the one or more lower spokes may be arranged with the base portion to transfer force application energy from the force application to the base portion and a vehicle engine compartment housing the vehicle shock tower component. The top portion, the upper portion, the lower portion, and the base portion may be formed as a single unit via an additive manufacturing process. The additive manufacturing process may include forming the one or more upper spokes with a first plurality of bonded layers defining a first component width and forming the one or more lower spokes with a second plurality of bonded layers defining a second component width different than the first component width. The one or more upper spokes may include four upper spokes and the one or more lower spokes may include seven lower spokes.

According to another aspect of the present disclosure, a vehicle shock tower forming process includes identifying load paths on a vehicle component based on a force application to an upper portion of the vehicle component; forming a first spoke of the upper portion of the vehicle component of a first plurality of bonded layers defining a first component width; and forming a second spoke of a lower portion of the vehicle component of the bonded layers and extending from the first spoke to a base frame and defining a second component width. A size and shape of the first spoke and the second spoke is based on the identified load paths. The forming process may further include identifying the load paths based on a predetermined minimum spoke thickness, a predetermined maximum spoke thickness, and a shock tower volume fraction target percentage. The forming process may further include forming the spokes in one of a web-like, bone-like, and scaffolding-like structure. The process may further include identifying the load paths on a vehicle component formed via casting.

DETAILED DESCRIPTION

The disclosed embodiments of the present disclosure are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
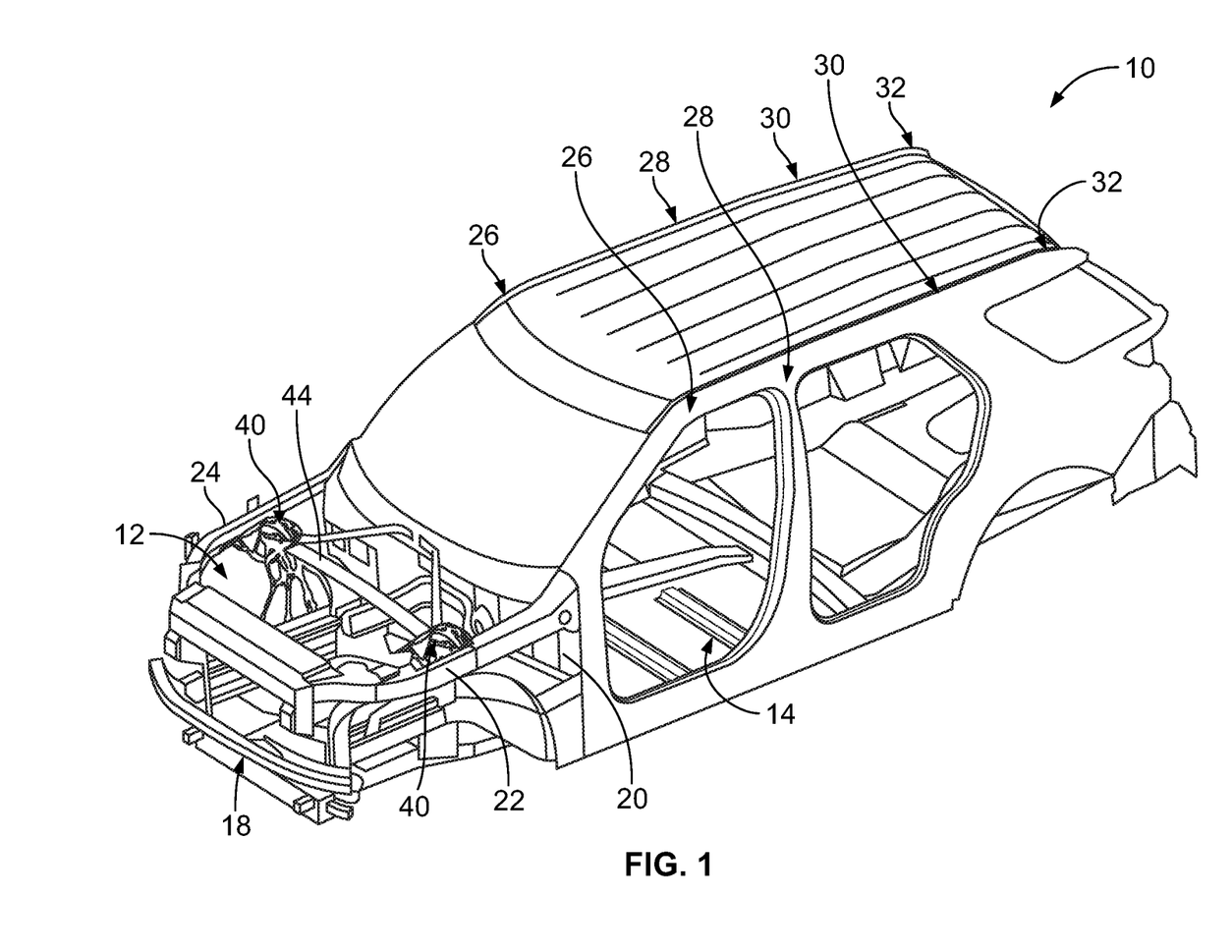
FIG. 1 is a perspective view of an example of a portion of a vehicle body.

FIG. 1 illustrates an example of a vehicle body, referred to generally as a vehicle body 10 herein. The vehicle body 10 includes an engine compartment 12 and a cabin 14. The engine compartment 12 is defined between a forward end 18, a cabin panel 20, a first frame component 22 and a second frame component 24. The vehicle body 10 includes a A-pillar region 26, a B-pillar region 28, a C-pillar region 30, and a D-pillar region 32. The pillars are arranged with one another to define openings for doors or windows.

Figure 2:
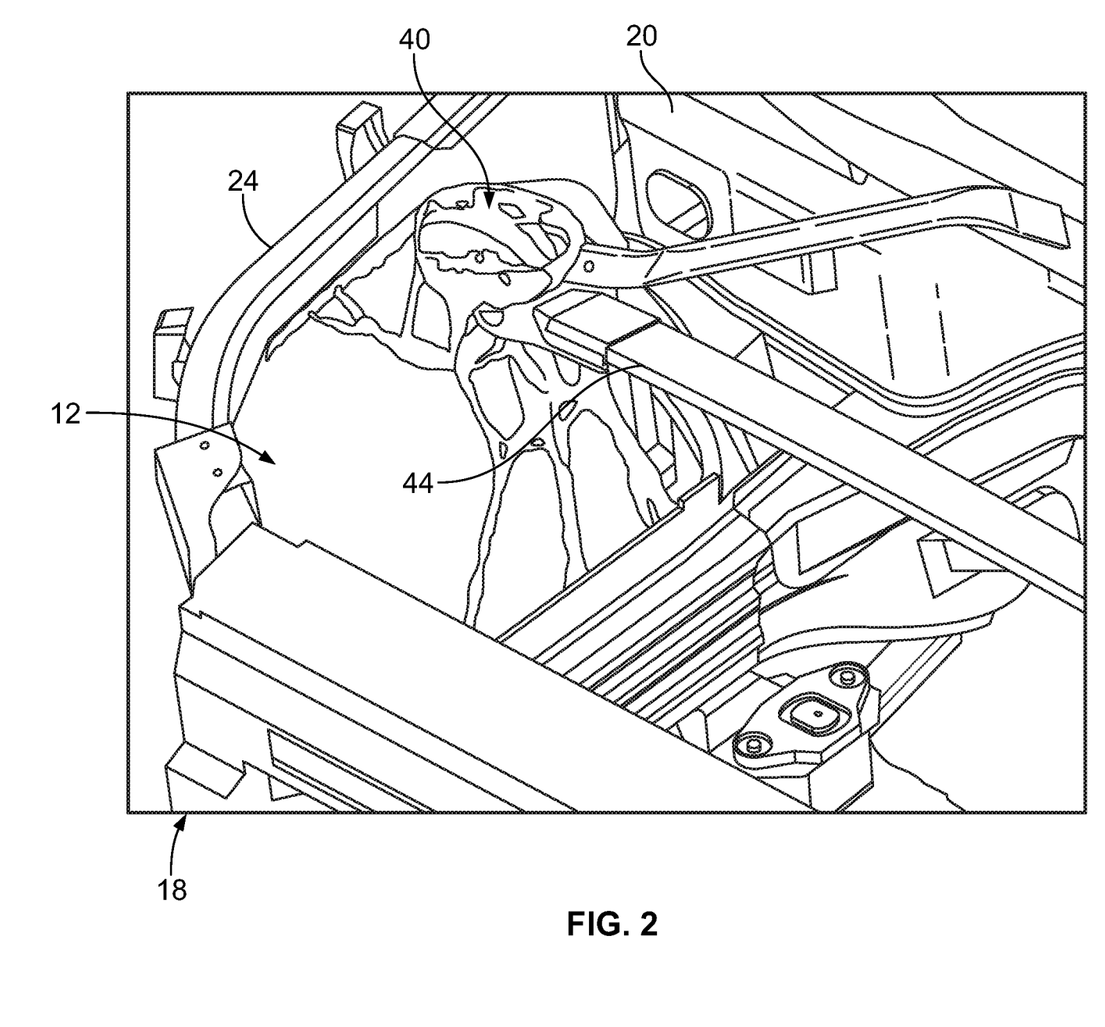
FIG. 2 is a detailed, fragmentary perspective view of a portion of an engine compartment of the vehicle body of FIG. 1.

FIG. 2 illustrates further detail of the engine compartment 12. The engine compartment 12 includes a pair of shock tower components 40, each disposed on one of opposing sides of the engine compartment 12 and adjacent a respective wheel well (not shown in FIGS. 1 and 2). Each of the shock tower components 40 is secured to one of the first frame component 22 or the second frame component 24, a cross beam 44, and one of the respective wheel wells. A presence of the cross beam 44 is optional based on a type of vehicle including the engine compartment 12. For example, the cross beam 44 may be included to improve vehicle drive performance. Each of the shock tower components 40 assists in managing stresses received by the vehicle body 10 during operation thereof.

Figure 3:
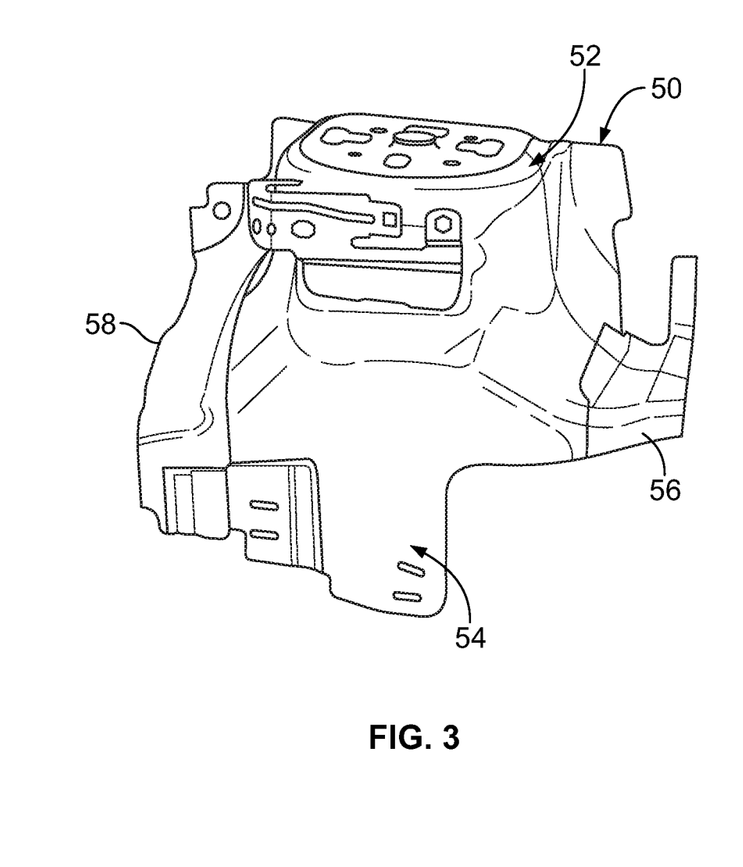
FIG. 3 is an example of a vehicle shock tower component formed via stamping.

In FIG. 3, a shock tower component 50 includes an upper portion 52 and a lower portion 54. The shock tower component 50 is secured to a first engine compartment component 56, such as a front rail, and a second engine compartment component 58, such as a shotgun rail. In this example, the shock tower component 50 is formed via a stamping process.

Figure 4:
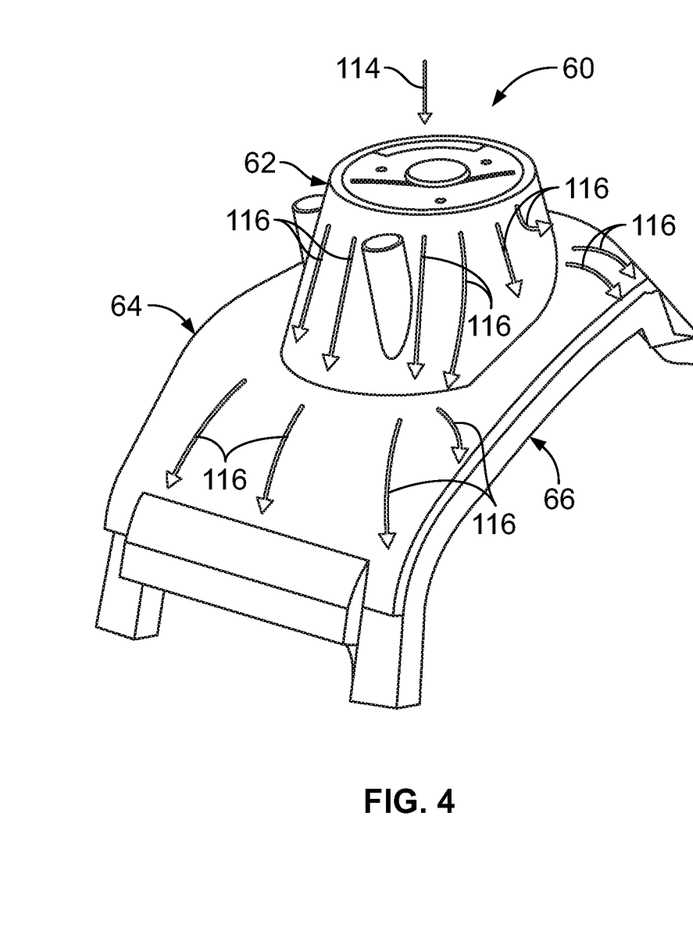
FIG. 4 is an example of a digitally modeled shock tower component sized based on available packaging space within an engine compartment.

FIG. 4 illustrates a shock tower component 60 including an upper portion 62 and a lower portion 64. The shock tower component 60 may be digitally created in 3D software to assist in identifying load paths resulting from a force application. The shock tower component 60 may be sized and shaped based on similar cast components. The lower portion 64 extends from a base portion 66. Each of the shock tower component 50 and the shock tower component 60 are for mounting within a vehicle engine compartment to absorb loads from a vehicle suspension in mechanical communication therewith.

The shock tower component 60 may also be created to provide a volumetric example of available packaging space for a shock tower component within an engine compartment. For example, a vertical force represented by force arrow 114 may be applied to the shock tower component 60, shown applied to the upper portion 62 in FIG. 4. The vertical force may be, for example, a force from a spring in mechanical communication with the shock tower component 60 and a vehicle tire. Load paths, represented by load path arrows 116, result from the applied vertical force represented by force arrow 114. Identification of the load paths represented by load path arrows 116 may assist in designing a shock tower component with a reduced amount of material while including material along the load paths such that the shock tower component may adequately disperse a force applied thereto.

FIGS. 5 through 8 illustrate an example of a shock tower formed via an additive manufacturing process, such as 3D printing, that is designed to reduce an amount of material in comparison to previous shock tower examples while providing a structure to adequately disperse an applied force. A shock tower 100 includes a top portion 102, an upper portion 104, a lower portion 106, and a base portion 108. The top portion 102 defines a plane 109. The upper portion 104 extends from the top portion 102. The lower portion 106 extends from the upper portion 104 to the base portion 108. The top portion 102, the upper portion 104, the lower portion 106, and the base portion 108 may be formed integrally with one another as a single unit. In one example, the shock tower 100 may be formed of a steel alloy, aluminum, carbide, copper, a heavy alloy, stainless steel, high performance steel, titanium, and tool steel.

In an example of an additive manufacturing process such as the 3D printing process, layers of material may be printed onto a printing bed with additional layers of the material being applied to previously deposited layers. This layered approach may reduce an amount of excess material of the vehicle component being formed. Each layer may be cured by applying heat or light that solidifies the printed layer. Selective laser melting (SLM), direct metal laser sintering (DMLS), selective laser sintering (SLS), fused deposition modeling (FDM), fused filament fabrication (FFF), stereo lithography (SLA) and laminated object manufacturing (LOM) may be used to solidify the printed layers. The single unit shock tower 100 may be oriented within a 3-D printing machine to print the portions of the shock tower 100 as a single unit to form structures not possible or not feasible to create with a stamping or casting process. The shock tower 100 may be formed by selective depositing of the layers or by applying the layers over an entire area and then selectively sintering or melting the layer after deposited to leave areas that may become voids in the finished shock tower 100. In one example, the layers of material may be metal powder.

Figure 5:
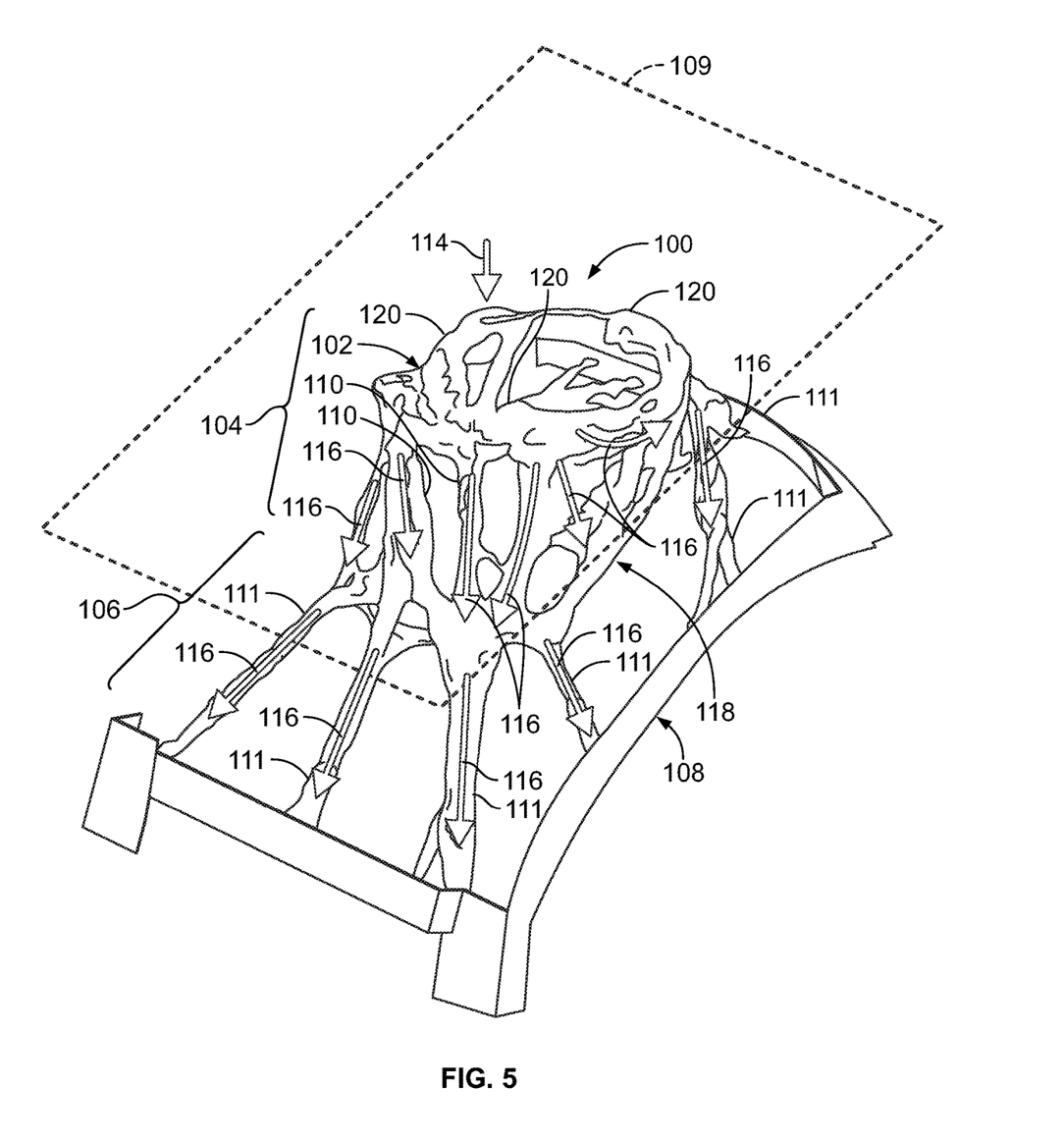
FIG. 5 is a perspective front view of an example of a vehicle shock tower component.
Figure 6:
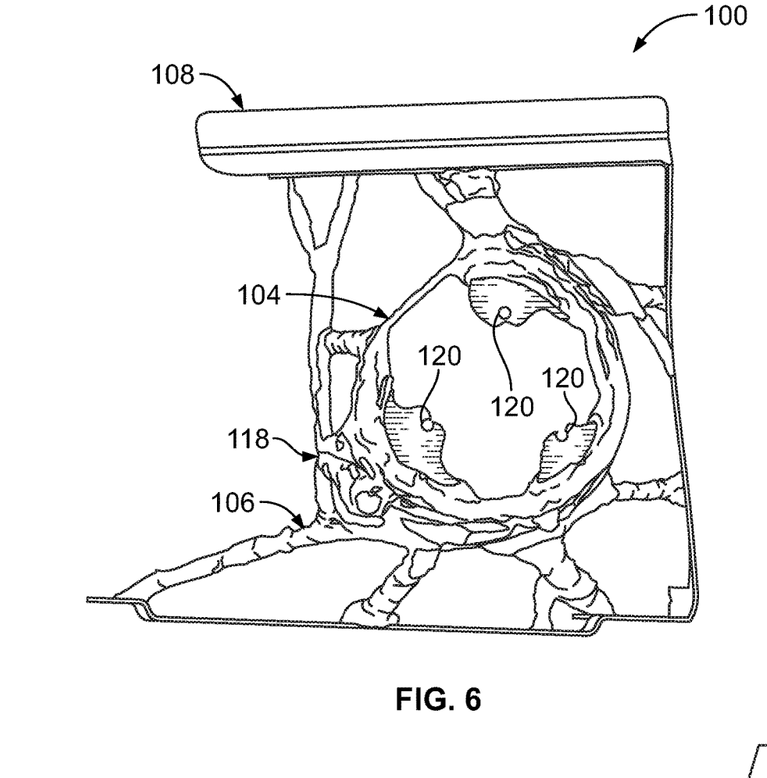
FIG. 6 is a top plan view of the vehicle shock tower component of FIG. 5.
Figure 7:
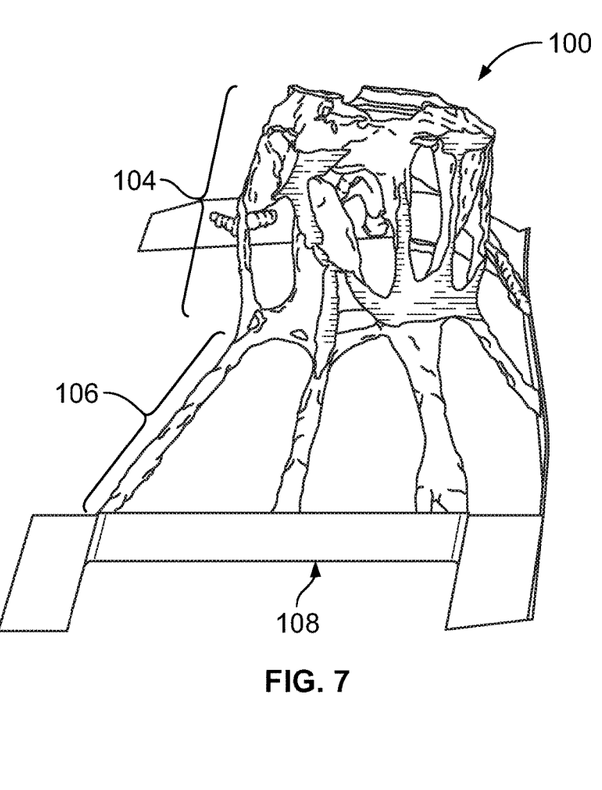
FIG. 7 is a perspective front view of the vehicle shock tower component of FIG. 5.

The upper portion 104 includes upper spokes 110. The lower portion 106 includes lower spokes 111. The upper spokes 110 and the lower spokes 111 may extend along predetermined load paths corresponding to a force application to the top portion 102. For example, the shock tower 100 may be structured based on the load paths identified in creating the shock tower component 60. The vertical force represented by force arrow 114 and the load paths represented by load path arrows 116 are shown in FIG. 5. A width, size, and/or shape of each of the upper spokes 110 and the lower spokes 111 may be based on a stiffness ratio identified to adequately disperse the load paths resulting from the applied force represented by force arrow 114.

In one example, the upper spokes 110 may be formed by a first plurality of bonded layers having a first unique layer thickness optimized to enable faster printing without compromising a structural integrity of the upper portion 104. The spokes 111 of the lower portion 106 may be formed by a second plurality of bonded layers having a second unique layer thickness optimized to enable faster printing without compromising a structural integrity of the lower portion 106 which may be different than the first unique layer thickness.

The vertical force represented by force arrow 114 may be applied to the top portion 102 in a direction substantially perpendicular to the plane 109. Each of the upper spokes 110 and the lower spokes 111 extend along one of the load paths to assist in dispersing resulting loads from the vertical force applied to the top portion 102 to the vehicle body, such as portions of the body-in-white. For example, the upper spokes 110 may extend substantially vertically from the top portion 102 relative to the plane 109. The lower spokes 111 may extend from the upper spokes 110 at an angle.

Each of the upper spokes 110 and the lower spokes 111 may be non-uniform in shape and form a web-like, bone-like, or scaffolding-like structure as shown in FIGS. 5 through 8. For example, each of the upper spokes 110 and the lower spokes 111 may have a combination of curved and rigid surfaces. The spokes may define intersection regions in locations where the load paths are preidentified as crossing one another. For example, an intersection region 118 may be located at a region in which load paths converge and resulting stresses are higher than in other regions of the shock tower 100.

The top portion 102 may include one or more receiving openings 120. The one or more receiving openings 120 may also be referred to as apertures herein. Each of the one or more receiving openings 120 is sized to receive a fastener to secure the shock tower 100 to an adjacent vehicle component. Each of the one or more receiving openings 120 may be radially spaced about an edge of the upper portion 104. In one example, the one or more receiving openings 120 may assist in securing the shock tower 100 to a vehicle wheel well and suspension mount.

Figure 8:
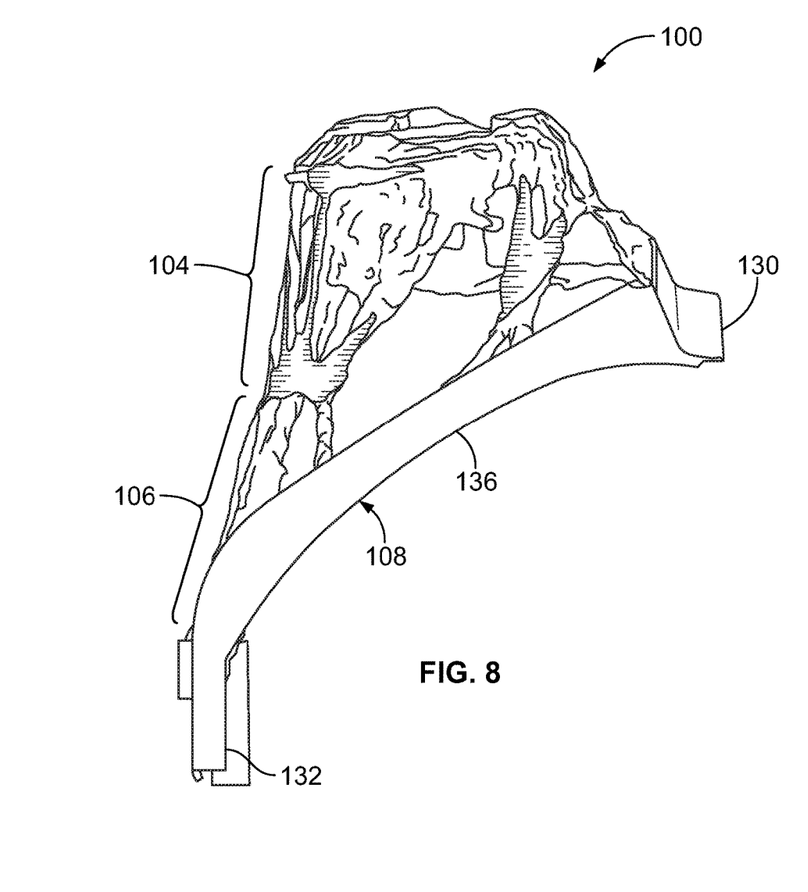
FIG. 8 is a side view of the vehicle shock tower component of FIG. 5.

The lower spokes 111 may connect with the base portion 108. The base portion 108 may be sized for mounting to an adjacent vehicle component, such as a shotgun rail or front rail. FIG. 8 is a side view of the shock tower 100 showing further detail of the base portion 108. The base portion 108 may include an upper base portion 130, a lower base portion 132, and an arc base portion 136 extending therebetween. The upper base portion 130 may be shaped for mounting to an engine compartment component such as a shotgun rail. The lower base portion 132 may be shaped for mounting to an engine compartment component such as a front rail. The arc base portion 136 may be shaped for mounting to a wheel well.

As mentioned above, applied forces and the corresponding load paths may be simulated by software to assist in identifying locations and shapes for each of the spokes of the shock tower 100. For example, a user may input system variables, such as minimum member thickness, a maximum member thickness, and a desired volume, into a simulator along with other vehicle component requirements. The simulator may then be run to identify load paths based on the variables and a force application. The user may then use the identification of the load paths to construct corresponding spokes for the load paths to extend therethrough. Excess material may then be eliminated from the design to obtain an embodiment such as the shock tower 100. The shock tower 100 may thus be formed of less material than the shock tower component 50.

Figure 9:
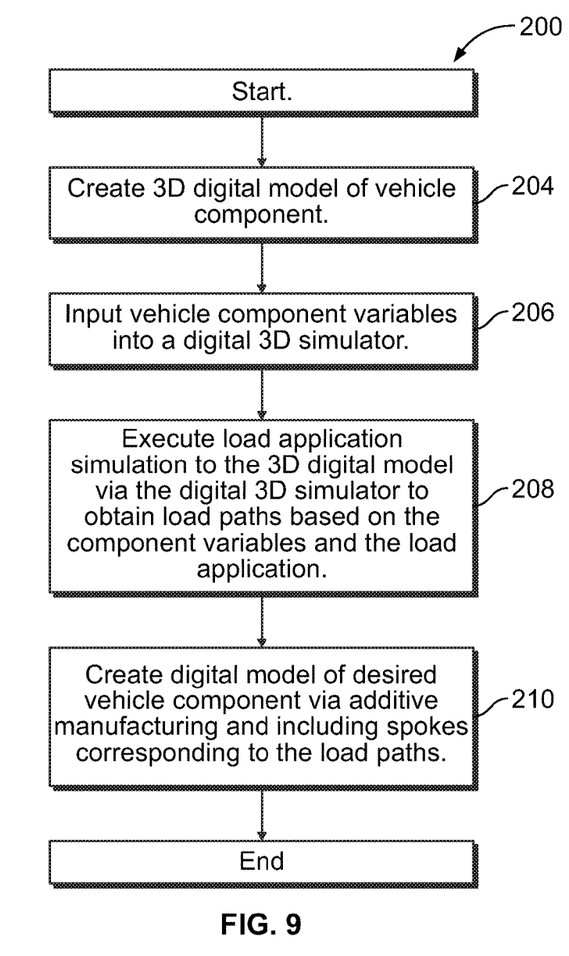
FIG. 9 is a flow chart illustrating an example of a vehicle component design and creation process.

FIG. 9 is a flow chart illustrating an example of a vehicle component creation process, referred to generally as a process 200. In operation 204, a 3D digital model of a vehicle component may be created via software to identify available package space for the vehicle component. For example, a 3D digital model of the shock tower component 60 of FIG. 4 may be created using a computer aided design (CAD) program.

In operation 206, component variables may be input into the 3D digital model relating to the vehicle component. In one example, a type of material, a thickness of material, and size specifications may be input into the 3D digital model.

In operation 208, a load application simulation may be initiated upon the 3D digital model to identify load paths based on the component variables and a force application. For example, a force application and resulting load paths may be simulated, such as the force represented by force arrow 114 and the load paths represented by load path arrows 116 shown in FIG. 4.

In operation 210, a digital model of a desired vehicle component may be created to form via an additive manufacturing process. The vehicle component may then be formed via the additive manufacturing process to have a structure adequate to disperse the force application and resulting load paths, such as the shock tower 100 shown in FIGS. 5 through 8.

Figure 10:
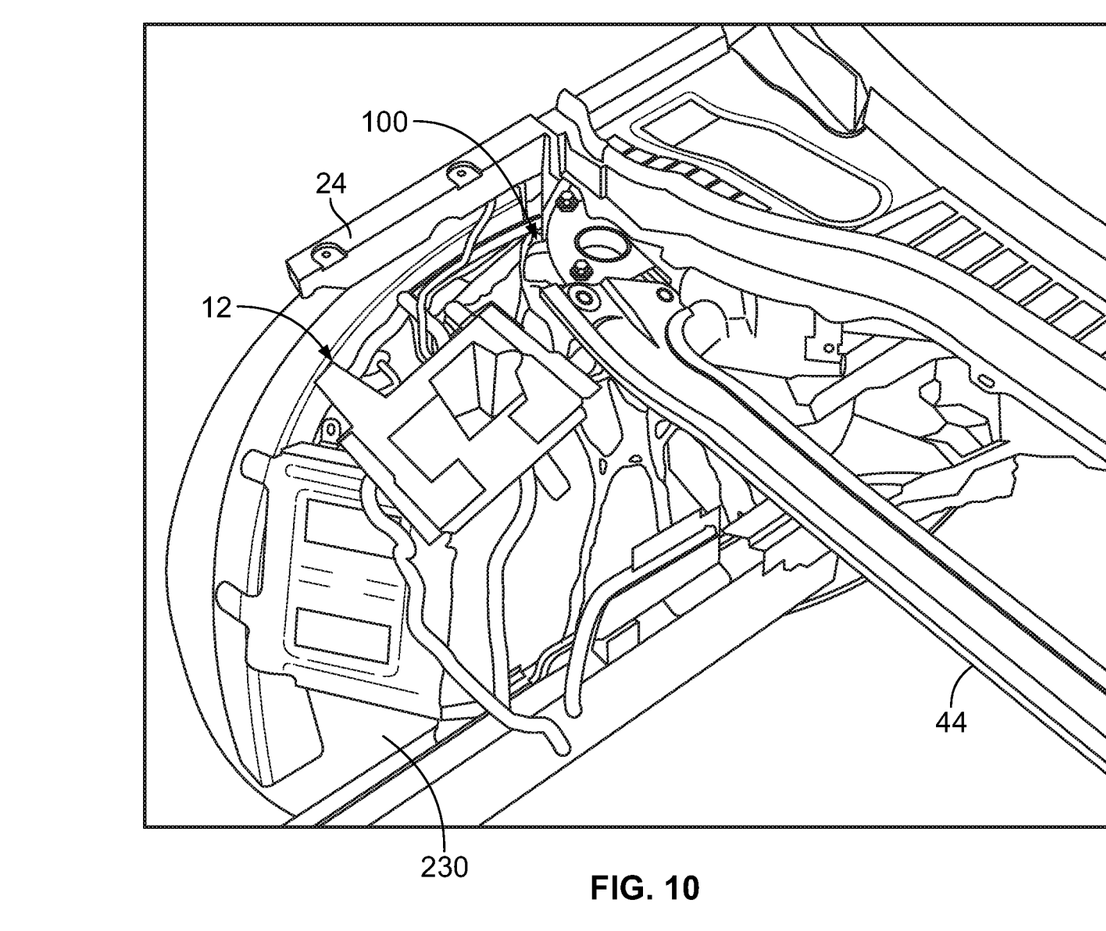
FIG. 10 is a fragmentary upper perspective view of the portion of the engine compartment of FIG. 2 including the vehicle shock tower component of FIGS. 5 through 8.
Figure 11:
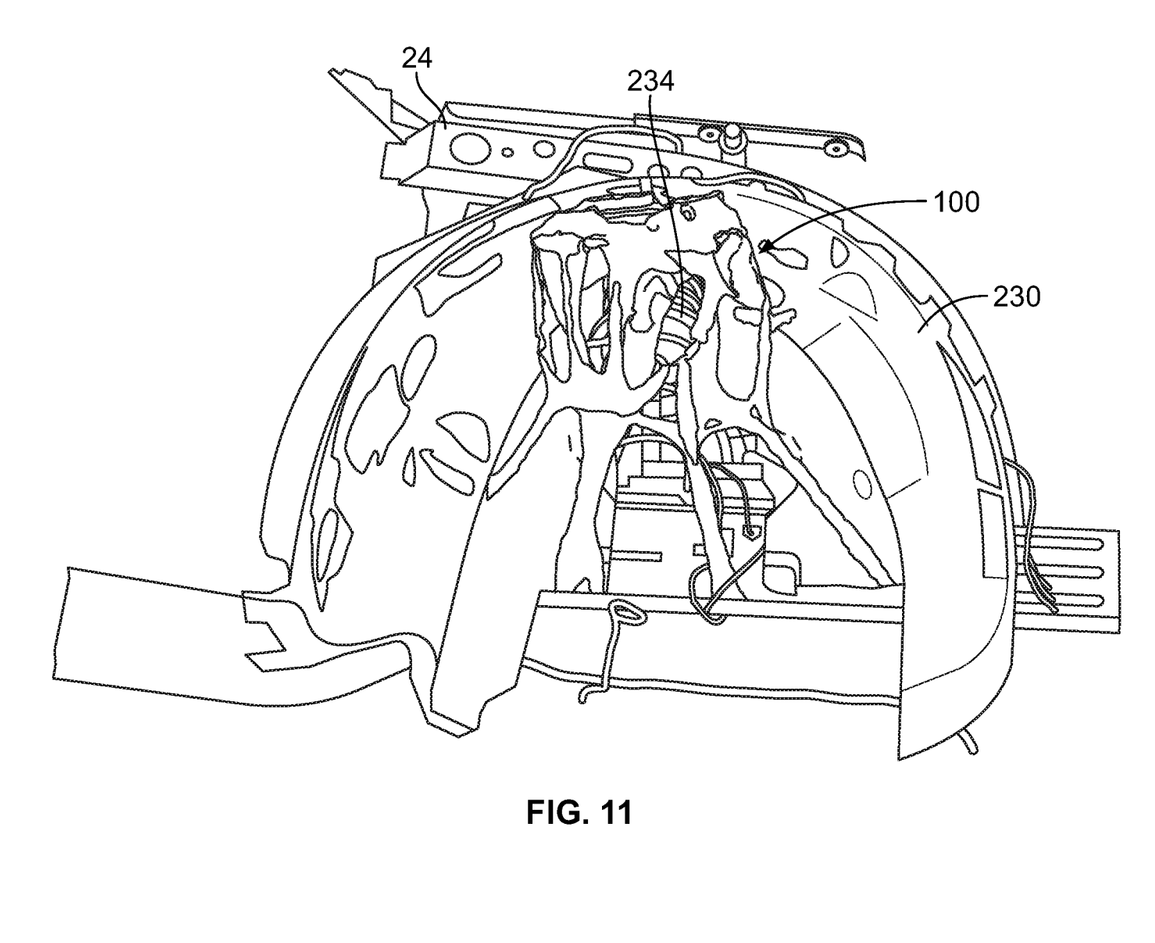
FIG. 11 is a fragmentary lower perspective view of a portion of FIG. 10.

FIGS. 10 and 11 are detailed perspective views of the shock tower 100 mounted within a portion of the engine compartment 12. The shock tower 100 is shown mounted to a wheel well 230 below the cross beam 44. A spring 234 may apply one or more forces to the shock tower 100 as a result of wheel movement during vehicle body 10 operation. The one or more forces may, for example, be represented by the force arrow 114.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle shock tower component comprising:
   a top portion defining a plane;
   an upper portion including one or more upper spokes having a thickness based on a stiffness ratio to disperse load paths resulting from a force application to the upper portion, the upper spokes extending substantially perpendicularly from the plane and an intersection spoke region extending substantially perpendicularly from the plane; and a lower portion including one or more lower spokes extending at an angle from the one or more upper spokes and the intersection spoke region to a base portion for securing to a vehicle wheel well, wherein each of the spokes is aligned with a load path defined by application of a force to the top portion in which the force is applied in a direction substantially perpendicular to the plane, and wherein each of the one or more upper spokes, the one or more lower spokes, and the intersection spoke region define non-uniform cross sections and include curved and soft-shaped surfaces resembling a bone-like structure.

2. The component of claim 1, wherein the one or more upper spokes, the one or more lower spokes, and the intersection spoke region are arranged with one another to define a web-like or scaffolding-like structure.

3. The component of claim 1, wherein the intersection spoke region is further defined as a region in which two of the load paths cross one another.

4. The component of claim 1, wherein each of the one or more upper spokes and the one or more lower spokes is arranged with the base portion to transfer force application energy from the force application to the base portion and a vehicle engine compartment housing the vehicle shock tower component.

5. The component of claim 1, wherein the top portion, the upper portion, the lower portion, and the base portion are formed as a single unit via an additive manufacturing process.

6. The component of claim 5, wherein the additive manufacturing process includes forming the one or more upper spokes with a first plurality of bonded layers defining a first component width and forming the one or more lower spokes with a second plurality of bonded layers defining a second component width different than the first component width.

7. The component of claim 1, wherein the one or more upper spokes includes four upper spokes and the one or more lower spokes includes seven lower spokes.

8. A vehicle shock tower forming process comprising:
identifying load paths on a vehicle component based on a force application to an upper portion of the vehicle component, a predetermined minimum spoke thickness, a predetermined maximum spoke thickness, and a shock tower volume fraction target percentage;

forming, a first spoke of the upper portion of the vehicle component of a first plurality of bonded layers defining a first component width; and forming, a second spoke of a lower portion of the vehicle component of the bonded layers and extending from the first spoke to a base frame and defining a second component width, wherein a size and shape of the first spoke and the second spoke is based on the identified load paths.

9. The forming process of claim 8 further comprising forming the spokes in one of a web-like, bone-like, and scaffolding-like structure.

10. The forming process of claim 8 further comprising identifying the load paths for a vehicle component formed via casting.

* * * * *